United States Patent
Hoffman et al.

(10) Patent No.: US 6,719,931 B2
(45) Date of Patent: Apr. 13, 2004

(54) LOW-VISCOSITY, MELAMINE-FORMALDEHYDE RESIN MICROCAPSULE DISPERSIONS WITH REDUCED FORMALDEHYDE CONTENT

(75) Inventors: Dietrich Hoffman, Rödersheim-Gronau (DE); Herbert Eisermann, Mannheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 10/169,092

(22) PCT Filed: Jan. 9, 2001

(86) PCT No.: PCT/EP01/00167
§ 371 (c)(1),
(2), (4) Date: Jul. 10, 2002

(87) PCT Pub. No.: WO01/51197
PCT Pub. Date: Jul. 19, 2001

(65) Prior Publication Data
US 2003/0004226 A1 Jan. 2, 2003

(30) Foreign Application Priority Data
Jan. 10, 2000 (DE) .......................... 100 00 621

(51) Int. Cl.$^7$ ................................. B01J 13/02
(52) U.S. Cl. .................. 264/4.3; 264/4.33; 264/4.7; 264/4.1; 427/213.31; 427/213.32
(58) Field of Search .................. 264/4.1, 4.3, 4.33, 264/4.7; 427/213.3, 213.31, 213.33, 213.34; 428/402.2, 402.21

(56) References Cited
U.S. PATENT DOCUMENTS

| 4,880,721 A | 11/1989 | Ishikawa |
| 4,898,696 A | 2/1990 | Sliwka |
| 4,918,317 A | 4/1990 | Hess et al. |
| 5,162,486 A | 11/1992 | Follmann et al. |
| 6,224,795 B1 | 5/2001 | Frank et al. |
| 6,261,483 B1 | 7/2001 | Frank et al. |

FOREIGN PATENT DOCUMENTS

| EP | 0 026 914 | 4/1981 |
| EP | 0 319 337 | 6/1989 |
| EP | 0 383 358 | 8/1990 |
| JP | 60-186479 | 9/1985 |
| JP | 62-223070 | 10/1987 |
| JP | 1-179765 | 7/1989 |
| JP | 9-45753 | 2/1997 |
| JP | 9-48668 | 2/1997 |
| JP | 9-48669 | 2/1997 |
| JP | 9-110405 | 4/1997 |

*Primary Examiner*—Rabon Sergent
*Assistant Examiner*—Thao Tran
(74) *Attorney, Agent, or Firm*—Oblon, Spivak, McClelland, Maier & Neustadt, P.C.

(57) ABSTRACT

Described is a process for preparing a dispersion of microcapsules by condensing a partially methylated melamine-formaldehyde resin having a molar ratio of melamine:formaldehyde:methanol of from 1:3.0:2.0 to 1:6.0:4.0 in water in which the essentially water-insoluble material forming the capsule core is present in dispersion in the presence of an alkali metal salt of a homopolymer or copolymer of 2-acrylamido-2-methylpropanesulfonic acid as protective colloid at a pH of from 3 to 6.5 by preforming the microcapsules at a temperature of from 20 to 50° C. and then curing the capsule wall of the preformed microcapsules at >50 to 100° C., which comprises adding from 5 to 100% by weight of melamine, based on the melamine-formaldehyde resin, in the course of curing. The microcapsule dispersions are formaldehyde-reduced and of low viscosity.

16 Claims, No Drawings

LOW-VISCOSITY, MELAMINE-FORMALDEHYDE RESIN MICROCAPSULE DISPERSIONS WITH REDUCED FORMALDEHYDE CONTENT

The invention relates to a process for preparing a dispersion of microcapsules by condensing partially methylated melamine-formaldehyde resin in water, in which the essentially water-insoluble material forming the capsule core is present in dispersion, in the presence of an anionic protective colloid. The invention further relates to the dispersions of microcapsules obtained by this process and to their use to prepare printing inks and paper-coating compositions.

Microdisperse particles which may have diameters in the range from about 0.1 to 100 μm, have found broad application in various fields. They are used, for example, as solid beads in polishing and/or cleaning compositions, as spacers in printing inks, as scale indicators for medical microscopy investigations, etc. In addition to the solid beads, microcapsules whose core material may comprise liquid, solid or gaseous substances which are essentially insoluble or insoluble in water are known. Examples of customary materials for the capsule walls are melamine-formaldehyde polymers, polyurethane, gelatin, polyamides, or polyureas. A widespread use is that of oil-filled microcapsules to prepare carbonless copying papers.

For this application, the oil-filled microcapsules are incorporated into paper-coating compositions with which paper substrates are coated. The nowadays customary high coating speeds require the paper-coating compositions to be of low viscosity, which in turn necessitates a low viscosity in the microcapsule dispersions. Nevertheless, the capsule concentration of the dispersions should be as high as possible in order to avoid an unnecessarily wet operation. In order to achieve a good color strength yield, moreover, a very narrow capsule size distribution is sought.

Owing to their preparation, dispersions of microcapsules comprising amino resins, such as melamine-formaldehyde resins, contain a greater or lesser amount of free formaldehyde. For reasons of ecology and occupational hygiene, the aim should be to keep the formaldehyde content as low as possible without adversely affecting other properties of the microcapsule dispersions. A distinction should be made here between the formaldehyde content of the dispersion itself and the formaldehyde content of the material coated with the dispersion. A low concentration of free formaldehyde in the aqueous capsule dispersion does not necessarily mean that a determination of the formaldehyde content in the coated material by means, for example, of cold-water extraction in accordance with DIN EN 645 and DIN EN 1541 will find low formaldehyde levels.

To reduce the formaldehyde content it is common to add formaldehyde scavengers to microcapsule dispersions based on melamine-formaldehyde resins. Ammonia, urea, ethyleneurea, and melamine, which are more or less effective in reducing the residual formaldehyde content in the capsule dispersion, are among the formaldehyde scavengers most commonly used.

EP-A-0 383 358 and DE-A-38 14 250 disclose light-sensitive materials comprising microcapsules whose walls are formed from melamine-formaldehyde resins. In order to remove excess formaldehyde, urea is added at the curing stage.

In the techniques described in EP-A-319 337 and U.S. Pat. No. 4,918,317, urea is added toward the end of curing.

EP-A-0 415 273 describes the preparation and use of mono- and polydisperse solid-bead particles of melamine-formaldehyde condensate. The use of ammonia, urea or ethyleneurea is proposed for binding the formaldehyde released during condensation.

Melamine-formaldehyde resin microcapsules notable for their uniform capsule size and imperviousness are known from EP-A-0 218 887 and EP-A-0 026 914. These capsule dispersions, however, still contain residual free formaldehyde, whose presence is undesirable in the context of further processing. EP-A-0 026 914 therefore recommends binding the formaldehyde, after curing, using ethyleneurea and/or melamine as formaldehyde scavengers.

DE 198 35 114 discloses dispersions of microcapsules based on melamine-formaldehyde resin, said resin being partially etherified and comprising a water-soluble primary, secondary or tertiary amine or ammonia. Prior to curing, urea is added as a formaldehyde scavenger.

DE 198 33 347 describes a process for preparing microcapsules by condensing melamine-formaldehyde resins and/or their methyl ethers, in which urea or urea whose amino groups are connected by an ethylene or propylene bridge is added as a formaldehyde scavenger prior to curing. Although the resultant dispersions are low in formaldehyde, the addition of urea prior to curing has an adverse effect on the stability of the microcapsules and on the viscosity of the microcapsule dispersion.

True, the addition of the abovementioned formaldehyde scavengers to the finished microcapsule dispersion or during the preparation of the microcapsule dispersion does generally lower the formaldehyde content of the dispersion. However, the formaldehyde content of papers coated with coating compositions comprising the microcapsule dispersions, as determinable by cold-water extraction, cannot be reduced below a certain limit even on adding large amounts of formaldehyde scavengers.

It is an object of the invention to provide a process for preparing a formaldehyde-reduced dispersion of microcapsules where the formaldehyde content of papers coated with the dispersion, as determinable by cold-water extraction, is very low. A further object is to provide low-viscosity microcapsule dispersions, especially low-viscosity microcapsule dispersions with a high solids content.

We have found that these objects are achieved by the process of the invention for preparing a dispersion of microcapsules by condensing a partially methylated melamine-formaldehyde resin having a molar ratio of melamine:formaldehyde:methanol of from 1:3.0:2.0 to 1:6.0:4.0 in water in which the essentially water-insoluble material forming the capsule core is present in dispersion in the presence of an alkali metal salt of a homopolymer or copolymer of 2-acrylamido-2-methylpropanesulfonic acid as protective colloid at a pH of from 3 to 6.5 by preforming the microcapsules at a temperature of from 20 to 50° C. and then curing the capsule wall at >50 to 100°C., which comprises adding from 5 to 100% by weight of melamine, based on the melamine-formaldehyde resin, in the course of curing.

It is assumed that, with the known methods of lowering the formaldehyde content by adding formaldehyde scavengers, such as ammonia, amines, etc., the formaldehyde released during the condensation is bound by the formation of an adduct from formaldehyde and scavenger. However, during the coating of paper substrates or the drying of the coated papers, this adduct is apparently cleaved back under the action of acidic groups, e.g., sulfonic acid groups of excess protective colloid which has not been incorporated into the capsule wall, so that formaldehyde continues to be determinable in the cold-water extract of the coated papers. In the case of the process of the invention, the formaldehyde released, the excess protective colloid, and the added melamine are bound irreversibly, the product that is formed presumably being deposited on the capsule walls. In addition to lowering the formaldehyde content as determinable by cold-water extraction, therefore, the process also achieves a reduction in the viscosity of the microcapsule dispersion, since the excess protective colloid, which is now present no longer in dissolved form in the aqueous phase but in chemically bonded form on the capsule wall, makes no contribution to the viscosity of the dispersion. Accordingly, the dispersions prepared in accordance with the invention may also, advantageously, be spray-dried, since the microcapsules exhibit essentially no "stickiness" with one another.

The process of the invention is generally conducted by combining the core material to be encapsulated, the partially methylated melamine-formaldehyde resin having a defined molar ratio of melamine:formaldehyde:methanol of from 1:3.0:2.0 to 1:6.0:4.0, preferably from 1:3.5:2.2 to 1:4.5:2.8, and in particular about 1:3.9:2.4, the protective colloid, and water, to a premix, adjusting the premix to a pH of from 3 to 6.5 using an acid, preferably formic acid, and subjecting the premix to shearing conditions in order to disperse the core material. The microcapsules preform at a temperature in the range from 20 to 50° C., preferably about 35° C.; i.e., around the dispersed droplets of the core material there is formed a wall of substantially uncrosslinked melamine-formaldehyde resin. The temperature is subsequently raised in order to cure the wall of the microcapsules by forming crosslinks. Curing of the capsule wall may be already observed above 50° C.; preferably, however, 65° C. and, with particular preference, 75° C. are chosen as the lower limit of the temperature range for curing. Since the dispersion is an aqueous dispersion, curing should be conducted at temperatures below 100° C., preferably below 95° C., and with particular preference below 80° C., as the upper temperature limit. Curing takes place at different rates depending on the pH of the dispersion, particularly good dispersion curing taking place at relatively low pH values of between 3 and 5. Above 50° C., however, curing is distinctly observable even in the weakly acidic to neutral pH range.

The optimum temperatures for the two steps of capsule preforming and capsule curing may be determined readily as a function of the respective pH by means of simple serial tests.

The capsule dispersion may be heated to the curing temperature in various ways. In one preferred embodiment, hot steam is injected into the capsule dispersion. The temperature of the steam is, for example, from 105 to 120° C. and the pressure from 1.5 to 3. It should be borne in mind that the solids content of the dispersion is lowered somewhat by the condensate.

In the process of the invention, after the curing temperature has been reached, melamine, i.e., cyanuric triamide, is added during curing to the microcapsule dispersion in portions or continuously, preference being given to a continuous addition. The amount of melamine added is from 5 to 100% by weight, preferably from 7 to 40% by weight, in particular from 12.5 to 35% by weight, based on the melamine-formaldehyde resin. One particularly preferred mode of addition comprises starting a feed of a melamine suspension to the dispersion of the preformed microcapsules, with an essentially constant mass flow rate, after the curing temperature has been reached. The mass flow is preferably chosen such that the addition extends over at least 50%, in particular at least 65%, of the curing period. The curing period is generally from 0.5 to 10 hours, typically from 1 to 3 hours.

The melamine is judiciously added in the form of an aqueous suspension whose pH has preferably been adjusted using an acid, e.g., formic acid, to from 3.8 to 5.0, preferably about 4.5, and which has, for example, a dry-matter content of from 15 to 80% by weight, preferably from 25 to 70% by weight. The average size of the melamine particles in the suspension is preferably from 1 to 50 $\mu$m, in particular from about 1 to 5 $\mu$m. The average particle size may be determined appropriately using a Malvern sizer.

It has additionally been found that the use of urea as well has a synergistic effect on the lowering of the formaldehyde content as determinable by cold-water extraction. The process of the invention may therefore be conducted advantageously in such a way that, in the course of curing, a mixture of melamine and urea with a weight ratio, for example, of from 20:1 to 1:20, preferably from 5:1 to 1:1, is added, judiciously in the form of an aqueous melamine suspension containing the urea in dissolved form.

Starting materials used for the wall material are partially ethylated melamine-formaldehyde resins, i.e., partial methyl ethers of melamine-formaldehyde resins having a molar ratio of melamine:formaldehyde:methanol of from 1:3.0:2.0 to 1:6.0:4.0, preferably from 1:3.5:2.2 to 1:4.5:2.8, in particular about 1:3.9:2.4. The methyl ethers are prepared, for example, in analogy to the specification in DE 198 35 114, the alcohol used being methanol and the regime being operated without the addition of melamine derivative. The molar ratios of melamine:formaldehyde:methanol in the melamine-formaldehyde resin used for the capsule preparation have a critical influence on the resultant viscosity of the capsule dispersion. The most favorable combination of solids content and viscosity in the microcapsule dispersions is obtained with the stated molar ratios.

Suitable core materials for the microcapsules are liquid, solid or gaseous substances which are essentially insoluble or insoluble in water. Examples include the following: liquids, such as alkylnaphthalenes, partially hydrogenated terphenyls, aromatic hydrocarbons, such as xylene, toluene, dodecylbenzene, aliphatic hydrocarbons, such as mineral spirit and mineral oil, paraffins, chlorinated paraffins, waxes of various chemical constitution, fluorohydrocarbons, natural oils, such as ground nut oil, soybean oil, and also adhesives, aromas, perfume oils, monomers, such as acrylate or methacrylates, styrene, active substances, such as plant protection products, red phosphorus, organic and inorganic pigments, e.g., iron oxide pigments; furthermore, solutions or suspensions of dyes and, in particular, of color formers and pigments in hydrocarbons, such as alkylnaphthalenes, partially hydrogenated terphenyl, dodecylbenzene, and other high-boiling liquids. Suitable color formers are described in the documents cited at the outset.

The core material is dispersed in a conventional manner in dependence on the size of the capsules to be prepared, as described, for example, in EP-A-0 026 914. Small capsules, especially when the intended size is less than 50 μm, require homogenizing or dispersing machines, which may be used with or without forced-flow means. It is essential that the homogenizing or dispersing machines are used at the beginning of the preforming phase. During the curing phase, the dispersion is merely circulated or mixed under low-shearing conditions in order to ensure uniform mixing.

The protective colloid used is an alkali metal salt of a homopolymer or copolymer of 2-acrylamido-2-methylpropanesulfonic acid, preferably the sodium salt. Suitable comonomers include acrylic acid, methacrylic acid, $C_{1-3}$-alkyl(meth)acrylates, hydroxy-$C_{2-4}$-(meth)acrylates and/or N-vinylpyrrolidone. The copolymer preferably contains at least 40% by weight of 2-acrylamido-2-methylpropanesulfonic acid units. Suitable homopolymers and copolymers are described in EP-A-0 562 344. The protective colloid preferably has a Fikentscher K value of from 100 to 170 or a viscosity of from 200 to 5000 mPas (measured in 20% strength by weight aqueous solution at 23° C. in a Brookfield RVT, spindle 3, at 50 rpm). Particularly preferred polymers are those having a K value of from 115 to 150 and those whose viscosity is from 400 to 4000 mPas.

The weight ratio of melamine-formaldehyde resin to protective colloid is preferably from 3:1 to 4.5:1, in particular from 3.5:1 to 4.0:1. The ratio of resin to protective colloid, and the nature of the protective colloid, influence the capsule size and the capsule size distribution.

The microcapsule dispersions prepared in accordance with the invention have a desirably low viscosity, so that it is possible to prepare even high-solids microcapsule dispersions possessing advantageous further-processing properties. The resulting microcapsule dispersions generally have a solids content of from 15 to 60% by weight, but preferably at least 45% by weight, in particular at least 48% by weight, and with particular preference from 50 to 53% by weight. The viscosity of the microcapsule dispersions (measured at 23° C. in a Brookfield RVT, spindle 3, at 50 rpm) is generally less than 100 mPas, in particular less than 90 mPas.

To prepare microcapsule dispersions with a high solids content, a judicious procedure is to prepare a premix comprising melamine-formaldehyde resin, protective colloid, and the material forming the capsule core, said premix having a solids content of at least 50% by weight, preferably about 55% by weight, effecting the preforming of the microcapsules at from 20 to 50° C., and heating the dispersion to the curing temperature for curing by injecting hot steam, the solids content of the dispersion being reduced to the desired level, e.g., about 50% by weight, by the steam condensate.

Using the process of the invention, dispersions of microcapsules are obtainable with an advantageously narrow capsule size distribution, characterized for example by a quotient $(d_{90}-d_{10})/d_{50}$ (span) of from 0.3 to 0.8, preferably from 0.3 to 0,5. The $d_{10}$, $d_{50}$ and $d_{90}$ figures indicate limits in relation to which 10%, 50% and, respectively, 90% of the capsules have a diameter smaller than or equal to the limit. The $d_{10}$, $d_{50}$ and $d_{90}$ figures may be determined appropriately using a Malvern sizer. Surprisingly, in contrast to what the skilled worker would expect, microcapsule dispersions having a desirably narrow size distribution are obtained even starting from premixes having a high solids content, e.g., more than 50% by weight. The microcapsules generally have an average diameter ($d_{50}$) in the range from 1 to 50 μm, in particular from 3 to 8 μm.

The examples which follow are intended to illustrate the process of the invention. The parts and percentages stated in the examples, unless specified otherwise, are by weight.

EXAMPLES

Measurement Methods Used

1. Solids Content

The solids content stated in the examples is determined by drying (4 h at 105° C.) and is composed essentially of the microcapsules and the water-soluble polymer. The capsule diameters were determined subjectively under the microscope, objectively using a Malvern sizer. The capsule diameters are stated in μm as the $d_{50}$ figure.

2. Viscosity

The viscosity of the capsule dispersions and of the 20% strength solutions of water-soluble protective colloids was measured at 23° C. using a Brookfield RVT with spindle 3 at 50 rpm. The Fikentscher K value (Cellulosechemie 13 (1932) 58 ff.) was determined, 0.5% strength in water.

3. Measurements of the Formaldehyde Concentration in Paper in Accordance with DIN EN 645 and DIN EN 1541

Paper coated (about 4.6 g/m$^2$) with a colored slip obtained by thoroughly homogenizing 8.75 g of water, 8.25 g of microcapsule dispersion, 1.30 g of a ground cellulose as spacer (Arbocel® BSM 55) and 1.30 g of a 50% by weight standard commercial binder dispersion based on a copolymer of styrene and butyl acrylate (Acronal® S 320 D) was shredded in accordance with DIN EN 645 and a cold-water extract was produced. The formaldehyde in the filtrate was determined photometrically using acetylacetone in accordance with DIN 1541.

EXAMPLES

Example 1

A 2 l cylindrical stirring vessel in which there was installed an infinitely adjustable disperser having a standard commercial dispersing disk with a diameter of 50 mm was charged in succession with 400 g of a 5% strength solution of a fluoran reactive dye mixture (consisting of 5 parts Pergascript® I-2RN, 20 parts Pergascript® I-2GN, 8 parts Pergascript® I-G, 67 parts Pergascript® I-R, from CIBA) in a mixture of diisopropylnaphthalene and linear alkane (boiling point 220° C.) in a ratio of 80:20, 69 g of a 70% strength solution of a methylated melamine-formaldehyde resin (molar ratio melamine:formaldehyde:methanol 1:3.9:2.4), 64 g of a 20% strength solution of poly-2-acrylamido-2-methylpropanesulfonic acid/sodium salt (K value 123; Brookfield viscosity 770 mpas), 350 g of mains water, and 15 g of 10% strength formic acid and this charge was processed to a capsule dispersion by adjusting the stirring speed to a peripheral speed of approximately 20 m/s. The temperature was held at about 35° C. After 60 minutes' dispersing, the dispersion was oil-free; a particle size of about 5 µm had established itself. The stirring speed of the dispersing disk was then reduced to a level sufficient for uniform circulation of the vessel contents. Following the setting of a cure temperature of 75° C. by injection of hot steam, a feed of a 27% suspension of melamine in formic acid, with a pH of 4.5, was started and was metered in over the course of an hour; a total of 67 g of the suspension was metered in. A cure phase of 120 minutes ensues. After the dispersion had been cooled to about 55° C., it was neutralized with diethanolamine and adjusted to a pH of 9.5 using ammonia.

This gave a uniform capsule dispersion with a solids content of 50% and a viscosity of 83 mPas. Analysis of the formaldehyde content in the cold-water extract gave a figure of 130 ppm. The capsule size distribution had a span of 0.43.

Example 2

The procedure for Example 1 was repeated except that the melamine suspension also contained 9 g of dissolved urea. The capsules were cured at 90° C.

The capsule size distribution of the resulting dispersion had a span of 0.36, the viscosity was 83 mPas, and the solids content was 50%. The formaldehyde content in the cold-water extract was 80 ppm.

The processing and copying properties of the capsule dispersions of Examples 1 and 2 meet present-day requirements.

Comparative Example 1

A 2 l cylindrical stirring vessel in which there was installed on infinitely adjustable disperser having a standard commercial dispersing disk with a diameter of 50 mm was charged with 286 g of mains water and this initial charge was mixed with 86 g of a 70% strength solution of a melamine-formaldehyde resin (molar ratio melamine:formaldehyde:methanol 1:3.9:2.4) where a viscosity of 275 mPas (DIN 51562) and a pH of 8.5. To this mixture there were added 80 g of a 20% strength solution of poly-2-acrylamido-2-methylpropanesulfonic acid/sodium salt (viscosity 770 mPas, K value 123) and the components were mixed. Subsequently, a reactive dye solution of 5% color former as in Example 1 in a mixture of diisopropylnaphthalene and linear alkane (boiling point 220° C.) in a ratio of 80:20 was added. The mixture was acidified with 15 ml of 10% strength formic acid and the stirring speed was set to a peripheral speed of about 20 m/s. The temperature was held at about 35° C. After 60 minutes' dispersing, the dispersion was oil-free; a particle size of about 5 µm had established itself. The stirring speed of the dispersing disk was then reduced to a level sufficient for uniform circulation of the vessel contents. The temperature of the dispersion was subsequently raised to 75° C. over the course of 30 minutes by injection of hot steam. A cure phase of 120 minutes ensued. After the dispersion had been cooled to about 55° C., it was neutralized with diethanolamine and adjusted to a pH of 9.5 using ammonia.

The Brookfield viscosity of this dispersion was about 120 mPas, the solids content 40%, and the formaldehyde content in the cold-water extract about 360 ppm.

Comparative Example 2

After curing and neutralization with diethanolamine instead of ammonia, 10 g of urea were added to the microcapsule dispersion prepared in accordance with Comparative Example 1. The Brookfield viscosity was about 120 mPas and the formaldehyde in the cold-water extract was about 260 ppm.

Comparative Example 3

Comparative Example 2 was repeated but adding the urea at the beginning of the dispersing phase.

The formaldehyde content in the cold-water extract was about 80 ppm, but the viscosity was about 350 mPas and the intensity and stability of the microcapsules were low.

Comparative Example 4

Comparative Example 1 was repeated but adding, on reaching the curing temperature, 18.1 g of melamine all at once to the capsule dispersion, said melamine having been prepared as a 27% slurry and acidified to a pH of 4.5 using formic acid. The dispersion thickened instantaneously. Flocs were formed and the dispersion coagulated. The copying capacity of remaining capsule residues was greatly reduced.

Comparative Example 5

Comparative Example 1 was repeated but using a partially methylated melamine-formaldehyde resin having a molar ratio of melamine:formaldehyde:methanol of 1:5.3:3.4. During the heating phase, a marked rise in viscosity was noted. The final Brookfield viscosity was 150 mPas and the formaldehyde content in the cold-water extract was 260 ppm.

As evident from the examples, dispersions of moderately good viscosity and high formaldehyde levels in the cold-water extract are obtained when using ammonia or urea as formaldehyde scavengers (cf. Comparative Examples 1 and 2). The addition of urea at the beginning of the dispersing phase (Comparative Example 3), although reducing the formaldehyde content, drastically raises the viscosity. The use of a partially methylated melamine-formaldehyde resin having a specific molar ratio of melamine:formaldehyde:methanol, to which a melamine suspension in formic acid is run in in the course of curing (Example 1), leads to a dispersion having a high solids content, a low viscosity and an acceptable formaldehyde content in the cold-water extract. When a mixture of melamine and urea in formic acid is added in the course of curing (Example 2), the same melamine-formaldehyde resin gives a dispersion having a solids content of 50%, a very low viscosity, and a low formaldehyde content in the cold-water extract.

We claim:

1. A process for preparing a dispersion of microcapsules, comprising: combining in water at a pH of from 3 to 6.5 an essentially water-insoluble core material to be encapsulated, a partially methylated melamine-formaldehyde resin having a molar ratio of melamine: formaldehyde:methanol of from 1:3.0:2.0 to 1:6.0:4.0, and an alkali metal salt of a homopolymer or copolymer of 2-acrylamido-2-methylpropane-sulfonic acid, preforming the microcapsules at a temperature of from 20 to 50° C., and then curing the capsule wall of the preformed microcapsules at >50 to 100° C., and adding, during the curing, from 5 to 100% by weight of melamine, based on the weight of the melamine-formaldehyde resin.

2. A process as claimed in claim 1, wherein the melamine is added in portions.

3. A process as claimed in claim 1, wherein the melamine is added continuously.

4. A process as claimed in claim 1, wherein a feed of a melamine suspension is started, with an essentially constant mass flow rate, after the curing temperature has been reached.

5. A process as claimed in claim 1, wherein a mixture of melamine and urea with a melamine/urea weight ratio of from 1:20 to 20:1 is added in the course of curing.

6. A process as claimed in claim 1, wherein the weight ratio of partially methylated melamine-formaldehyde resin to alkali metal salt of the homopolymer or copolymer of 2-acrylamido-2-methyl-propanesulfonic acid is from 3:1 to 4.5:1.

7. A process as claimed in claim 1, wherein the resulting microcapsule dispersion has a solids content of at least 45% by weight.

8. A process as claimed in claim 1, wherein the core material to be encapsulated is a liquid, solid or gaseous substance which is essentially insoluble or insoluble in water.

9. A process as claimed in claim 8, wherein the core material to be encapsulated is at least one member selected from the group consisting of alkylnaphthalenes, partially hydrogenated terphenyls, aromatic hydrocarbons, aliphatic hydrocarbons, paraffins, chlorinated paraffins, waxes, fluorohydrocarbons, natural oils, adhesives, aromas, perfume oils, monomers, styrene, plant protection products, red phosphorus, organic and inorganic pigments, and solutions or suspensions of dyes color formers and pigments in hydrocarbons.

10. A process as claimed in claim 1, wherein the addition of the melamine extends over at least 50% of the curing period.

11. A process as claimed in claim 1, wherein the addition of the melamine extends over at least 65% of the curing period.

12. A process as claimed in claim 10, wherein the curing period is from 0.5 to 10 hours.

13. A process for preparing a dispersion of microcapsules, comprising:

combining in water at a pH of from 3 to 6.5 an essentially water-insoluble core material to be encapsulated, a partially methylated melamine-formaldehyde resin having a molar ratio of melanhine:formaldehyde:methanol of from 1:3.0:2.0 to 1:6.0:4.0, and an alkali metal salt of a homopolymer or copolymer of 2-acrylamido-2methylpropanesulfonic acid, preforming the microcapsules at a temperature of from 20 to 50° C., and then injecting steam into the preformed microcapsules and curing the capsule wall of the preformed microcapsules at > 50 to 100° C., and adding, during the curing, from 5 to 100% by weight of melamine, based on the weight of the melamine4-formaldehyde resin.

14. A process as claimed in claim 13, wherein the addition of the melamine extends over at least 50% of the curing period.

15. A process as claimed in claim 13, wherein the addition of the melamine extends over at least 65% of the curing period.

16. A process as claimed in claim 14, wherein the curing period is from 0.5 to 10 hours.

* * * * *